(12) United States Patent
Haas et al.

(10) Patent No.: US 8,294,403 B2
(45) Date of Patent: Oct. 23, 2012

(54) METHODS AND SYSTEMS FOR DETERMINING AND DISPLAYING A TIME TO OVERLOAD OF MACHINE TOOLS

(75) Inventors: Gene F. Haas, Camarillo, CA (US); Kurt P. Zierhut, Camarillo, CA (US)

(73) Assignee: Haas Automation, Inc., Oxnard, CA (US)

( * ) Notice: Subject to any disclaimer, the term of this patent is extended or adjusted under 35 U.S.C. 154(b) by 460 days.

(21) Appl. No.: 12/554,847

(22) Filed: Sep. 4, 2009

(65) Prior Publication Data

US 2011/0057594 A1   Mar. 10, 2011

(51) Int. Cl.
*H02H 7/085* (2006.01)
*H02H 3/04* (2006.01)

(52) U.S. Cl. .................... 318/473; 318/490

(58) Field of Classification Search .......... 318/432–434, 318/456–458, 471–473, 490
See application file for complete search history.

(56) References Cited

U.S. PATENT DOCUMENTS

| | | | |
|---|---|---|---|
| 4,041,601 A | 8/1977 | Schimanski | |
| 4,060,851 A * | 11/1977 | Nakatsukasa et al. | 700/159 |
| 4,078,195 A | 3/1978 | Mathias et al. | |
| 4,291,355 A * | 9/1981 | Dinger | 361/31 |
| 4,319,298 A * | 3/1982 | Davis et al. | 361/24 |
| 4,324,161 A | 4/1982 | Klancnik et al. | |
| 4,327,614 A | 5/1982 | Klancnik et al. | |
| 4,351,029 A * | 9/1982 | Maxey et al. | 702/34 |
| 4,379,415 A | 4/1983 | Klancnik et al. | |
| 4,490,054 A | 12/1984 | Kimmelaar | |
| 4,512,116 A | 4/1985 | Vanderwal, Jr. et al. | |
| 4,536,849 A | 8/1985 | Borisch et al. | |
| 4,597,155 A | 7/1986 | Garnett et al. | |
| 4,683,638 A | 8/1987 | Winkler et al. | |
| 4,787,134 A | 11/1988 | Yamamoto et al. | |
| 4,887,221 A | 12/1989 | Davis et al. | |
| 5,019,760 A * | 5/1991 | Chu et al. | 318/490 |
| 5,140,529 A | 8/1992 | Peifer | |
| 5,414,632 A * | 5/1995 | Mochizuki et al. | 700/174 |
| 5,453,068 A | 9/1995 | Rütschle et al. | |
| 5,568,028 A | 10/1996 | Uchiyama et al. | |
| 5,660,480 A | 8/1997 | Fujii et al. | |
| 5,674,106 A | 10/1997 | Cheetham | |
| 5,746,644 A | 5/1998 | Cheetham | |
| 5,923,560 A | 7/1999 | Ozaki et al. | |
| 5,950,147 A * | 9/1999 | Sarangapani et al. | 702/179 |
| 6,119,074 A * | 9/2000 | Sarangapani | 702/185 |
| 6,189,424 B1 | 2/2001 | Wheeling et al. | |
| 6,266,572 B1 | 7/2001 | Yamazaki et al. | |
| 6,334,806 B1 | 1/2002 | Sano et al. | |
| 6,471,451 B2 | 10/2002 | Kojima et al. | |
| 6,551,033 B2 | 4/2003 | Kakino et al. | |
| 6,615,103 B2 | 9/2003 | Fujishima et al. | |
| 6,662,073 B1 | 12/2003 | Fujishima et al. | |
| 6,728,580 B2 * | 4/2004 | Hershey et al. | 700/21 |

(Continued)

*Primary Examiner* — Bentsu Ro

(74) *Attorney, Agent, or Firm* — McDermott Will & Emery LLP

(57) ABSTRACT

Systems and methods for determining and displaying a time to overload of a motor in a computer numerical controlled (CNC) machine tool are provided. A method includes monitoring a fuse level of a motor in a CNC machine tool and calculating a time to overload of the motor based on the fuse level. The method further includes displaying the time to overload on a user interface based on the fuse level of the motor and a load acting on the motor.

24 Claims, 7 Drawing Sheets

U.S. PATENT DOCUMENTS

| | | | |
|---|---|---|---|
| 6,834,256 B2 * | 12/2004 | House et al. | 702/181 |
| 6,836,698 B2 | 12/2004 | Fujishima et al. | |
| 6,885,984 B1 | 4/2005 | Suzuki et al. | |
| 6,915,173 B2 * | 7/2005 | Chan et al. | 700/44 |
| 6,961,637 B2 | 11/2005 | Scherer | |
| 7,245,983 B2 | 7/2007 | Suzuki et al. | |
| 2009/0096405 A1 * | 4/2009 | Flickinger et al. | 318/565 |
| 2009/0096406 A1 * | 4/2009 | Flickinger et al. | 318/565 |

* cited by examiner

FIG. 7

METHODS AND SYSTEMS FOR DETERMINING AND DISPLAYING A TIME TO OVERLOAD OF MACHINE TOOLS

FIELD

The present invention generally relates to machine tools and, in particular, relates to methods and systems for determining and displaying a time to overload of machine tools.

BACKGROUND

Machine tools are power-operated tools used for finishing or shaping parts. Machine tools operate by removing material from a workpiece. Basic machining operations include turning, facing, milling, drilling, boring, broaching, threading, and tapping. In addition, other operations include sawing, grinding, gear cutting, polishing, buffing, and honing. Computer numerical controlled (CNC) machine tools are machine tools that are operated by programmed commands that are stored in or entered into the CNC machine tool. During operation, a motor of the CNC machine tool accumulates heat and may overload, causing operation of the CNC machine tool to cease. Overloading may also cause damage to the CNC machine tool and is undesirable.

SUMMARY

According to various aspects of the subject technology, a method for determining a time to overload of a motor in a computer numerical controlled (CNC) machine tool is provided. The method comprises monitoring a fuse level of a motor in a CNC machine tool. The method further comprises calculating a time to overload of the motor based on the fuse level. The method further comprises displaying the time to overload on a user interface based on the fuse level of the motor and a load acting on the motor.

According to various aspects of the subject technology, a CNC machine tool is provided. The CNC machine tool comprises a motor and a controller. The controller is configured to monitor a fuse level of the motor in a CNC machine tool and calculate a time to overload of the motor based on the fuse level. The CNC machine tool further comprises a user interface configured to display the time to overload based on the fuse level of the motor and a load acting on the motor.

According to various aspects of the subject technology, a controller for a CNC machine tool comprises a user interface and a memory module containing executable instructions. The controller further comprises a processor configured to execute the instructions to perform a method for: monitoring a fuse level of a motor in a CNC machine tool; calculating a time to overload of the motor based on the fuse level; and displaying the time to overload on the user interface based on the fuse level of the motor and a load acting on the motor.

According to various aspects of the subject technology, a machine-readable medium encoded with executable instructions for determining a time to overload of a motor in a CNC machine tool is provided. The instructions comprise code for monitoring a fuse level of a motor in a CNC machine tool. The instructions further comprise code for calculating a time to overload of the motor based on the fuse level. The instructions further comprise code for displaying the time to overload on a user interface based on the fuse level of the motor and a load acting on the motor.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIG. 7 illustrates an example of a user interface, in accordance with one aspect of the subject technology.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail so as not to obscure the present invention.

A motor of a machine tool accumulates heat during its operation. The motor may be operated under a maximum continuous load, which refers to the maximum load that can be applied continuously to the motor without overloading the motor. For example, a load of about 100% or less of the maximum continuous load acting on a motor may allow the motor to operate indefinitely without overloading. Loads beyond a maximum continuous load (e.g., loads greater than about 100% of the maximum continuous load) may also be applied to a motor, but may result in overloading of the motor if such a load is applied for too long.

When a motor of a machine tool overloads, operation of the machine tool is stopped. The point at which a motor of a machine tool overloads may be referred to as a trip point or a fault point. If a motor of a machine tool runs out of axis thrust and overload occurs, for example, an operator of the machine tool has to cease operation of the machine tool prematurely or unexpectedly, thus reducing work efficiency. According to one aspect of the subject technology, the time remaining before a motor of a machine tool is expected to overload (e.g., the time to overload) is determined and displayed to provide an operator advanced warning of an impending overload.

Various benefits are associated with providing operators of machine tools with knowledge of the time remaining before the machine tool overloads. Time to overload information allows operators to optimize cutting parts on the machine. For example, an operator with knowledge of the time to overload can optimize a program speed of cutting out material or can confidently override a machine tool's programmed cutting rate at various times in the program knowing that the machine tool has a certain amount of time remaining before overload occurs. The time to overload information also allows operators to move a cutter of a machine tool away from the surface before overload of a motor of the machine tool occurs. Otherwise, if the motor overloads while cutting, the machine tool may cease operation in the middle of cutting a workpiece, which may affect the surface finish of the workpiece. With knowledge of the time to overload, an operator of a machine tool may minimize making iterative attempts to optimize cutting parts. According to one aspect of the subject technology, a time to overload is displayed in a countdown timer in seconds as a motor of a machine tool is driven towards overload.

Figure 1:
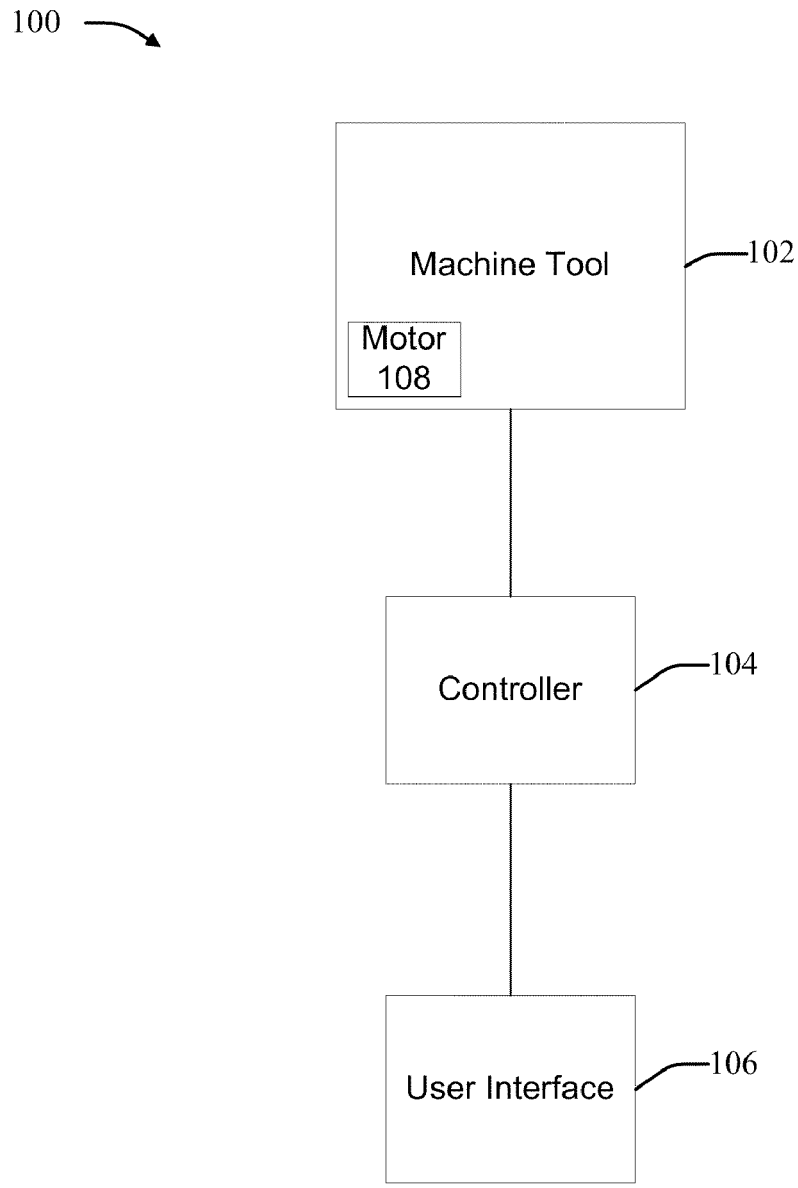
FIG. 1 is a block diagram of a machine tool system, in accordance with one aspect of the subject technology.

FIG. 1 is a block diagram of CNC machine tool system 100, in accordance with one aspect of the subject technology. CNC machine tool system 100 comprises machine tool 102, controller 104, and user interface 106. Machine tool 102 comprises motor 108. The operation of machine tool 102 is controlled by one or more programs stored in or entered into controller 104, for example. Thus, an operator of CNC machine tool system 100 may control the operation of machine tool 102 by selecting, modifying, and/or creating programs stored in controller 104 via user interface 106.

Machine tool 102 may be any suitable power operated machine tool known to those of skill in the art. Motor 108 uses electrical energy in order to produce mechanical energy. Controller 104 controls how much electrical energy is supplied to motor 108 so that motor 108 can convert the electrical energy into mechanical energy for removing material from a workpiece. For example, motor 108 may be coupled to a tool for cutting and/or shaping a workpiece. Controller 104 may control an amount of current supplied to motor 108 to determine a rotational speed of motor 108. The current may relate to metal removal rates or force. For example, the current may be increased to maintain speed or increase force. In some aspects, motor 108 may comprise a servo or spindle motor of machine tool 102. Machine tool 102 may also comprise multiple motors, with a different time to overload associated with each motor.

Controller 104 may comprise a computer, a processor, and/or other suitable processing units for controlling the operation of CNC machine tool system 100. User interface 106 may comprise a display screen, a sound system, a keyboard, a mouse, a touch screen, or any other suitable device to allow interaction between controller 104 and an operator of CNC machine tool system 100. Controller 104 communicates the time to overload of machine tool 102 to an operator of CNC machine tool system 100 via user interface 106. For example, user interface 106 may be a liquid crystal display (LCD) monitor that displays the time to overload to the operator. In another example, user interface 106 may comprise one or more speakers that report the time to overload to the operator.

Figure 2:
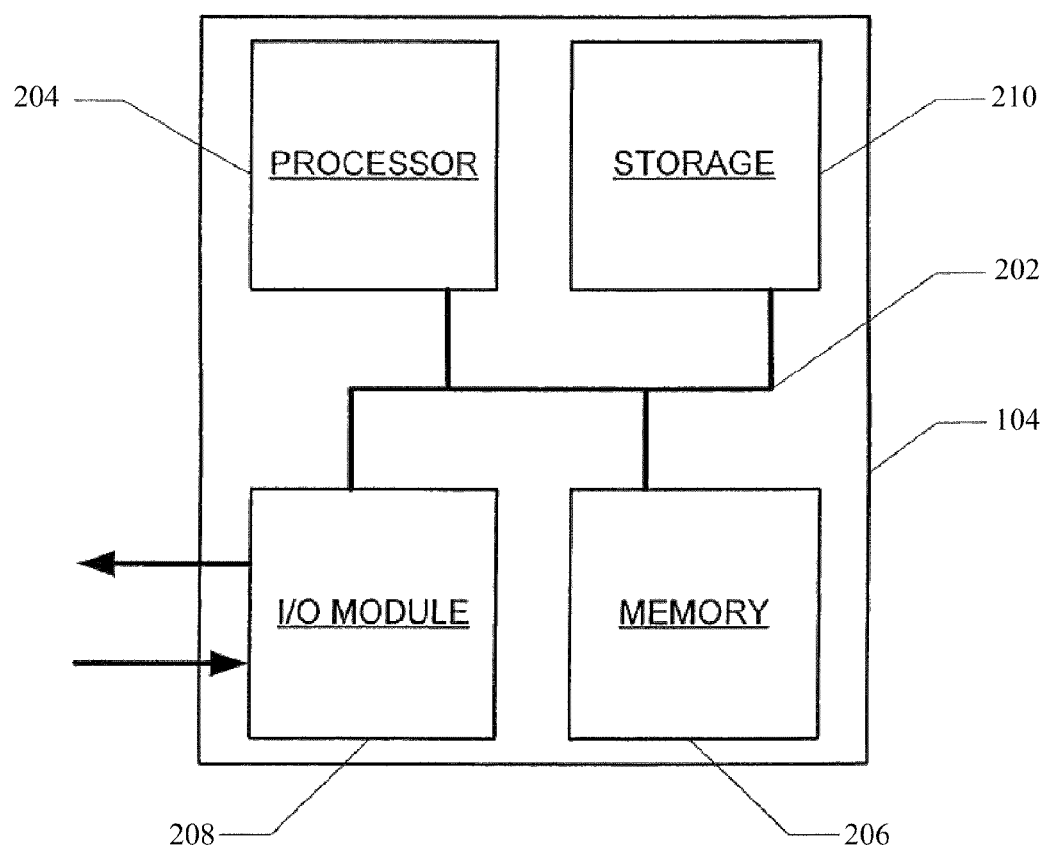
FIG. 2 is a block diagram illustrating an example of a controller upon which one aspect of the subject technology may be implemented.

FIG. 2 is a block diagram illustrating an example of controller 104 upon which one aspect of the subject technology may be implemented. Controller 104 comprises processor module 204, storage module 210, input/output (I/O) module 208, memory module 206, and bus 202. Bus 202 may be any suitable communication mechanism for communicating information. Processor module 204, storage module 210, I/O module 208, and memory module 206 are coupled with bus 202 for communicating information between any of the modules of controller 104 and/or information between any module of controller 104 and a device external to controller 104. For example, information communicated between any of the modules of controller 104 may include instructions and/or data.

In some aspects, processor module 204 may comprise one or more processors, where each processor may perform different functions or execute different instructions and/or processes. For example, one or more processors may execute instructions for operating machine tool 102, one or more processors may execute instructions for determining the time to overload of machine tool 102, and one or more processors may execute instructions for input/output functions.

Memory module 206 may be random access memory ("RAM") or other dynamic storage devices for storing information and instructions to be executed by processor module 204. Memory module 206 may also be used for storing temporary variables or other intermediate information during execution of instructions by processor 204. In some aspects, memory module 206 may comprise battery-powered static RAM, which stores information without requiring power to maintain the stored information. Storage module 210 may be a magnetic disk or optical disk and may also store information and instructions. In some aspects, storage module 210 may comprise universal serial bus (USB) memory, Ethernet connectivity memory storage, hard disk storage, or electronic memory storage (e.g., flash memory). In some aspects, memory module 206 and storage module 210 are both a machine-readable medium.

Controller 104 is coupled via I/O module 208 to user interface 106 of FIG. 1 for providing information to and receiving information from an operator of CNC machine tool system 100. For example, user interface 106 may be a cathode ray tube ("CRT") or LCD monitor for displaying information to an operator. User interface 106 may also include, for example, a keyboard or a mouse coupled to controller 104 via I/O module 208 for communicating information and command selections to processor module 204.

According to various aspects of the subject technology, methods described herein are executed by controller 104. Specifically, processor module 204 executes one or more sequences of instructions contained in memory module 206 and/or storage module 210. In one example, instructions may be read into memory module 206 from another machine-readable medium, such as storage module 210. In another example, instructions may be read directly into memory module 206 from I/O module 208, for example from an operator of CNC machine tool system 100 via user interface 106. Execution of the sequences of instructions contained in memory module 206 and/or storage module 210 causes processor module 204 to perform methods to determine a time to overload of motor 108. For example, a computational algorithm for determining the time to overload of motor 108 may be stored in memory module 206 and/or storage module 210 as one or more sequences of instructions. Once the time to overload is computed, the time to overload information may be communicated from processor module 204 to memory module 206 and/or storage module 210 via bus 202 for storage. In some aspects, the time to overload information may be communicated from processor module 204, memory module 206, and/or storage module 210 to I/O module 208 via bus 202. The time to overload information may then be communicated from I/O module 208 to an operator of CNC machine tool system 100 via user interface 106.

One or more processors in a multi-processing arrangement may also be employed to execute the sequences of instructions contained in memory module 206 and/or storage module 210. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 204 for execution. Such a medium may take many forms, including, but not limited to, non-volatile media, volatile media, and transmission media. Non-volatile media include, for example, optical or magnetic disks, such as storage module 210. Volatile media include dynamic memory, such as memory module 206. Transmission media include coaxial cables, copper wire, and fiber optics, including the wires that comprise bus 202. Transmission media can also take the form of acoustic or light waves, such as those generated during radio frequency and infrared data communications. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Figure 3:
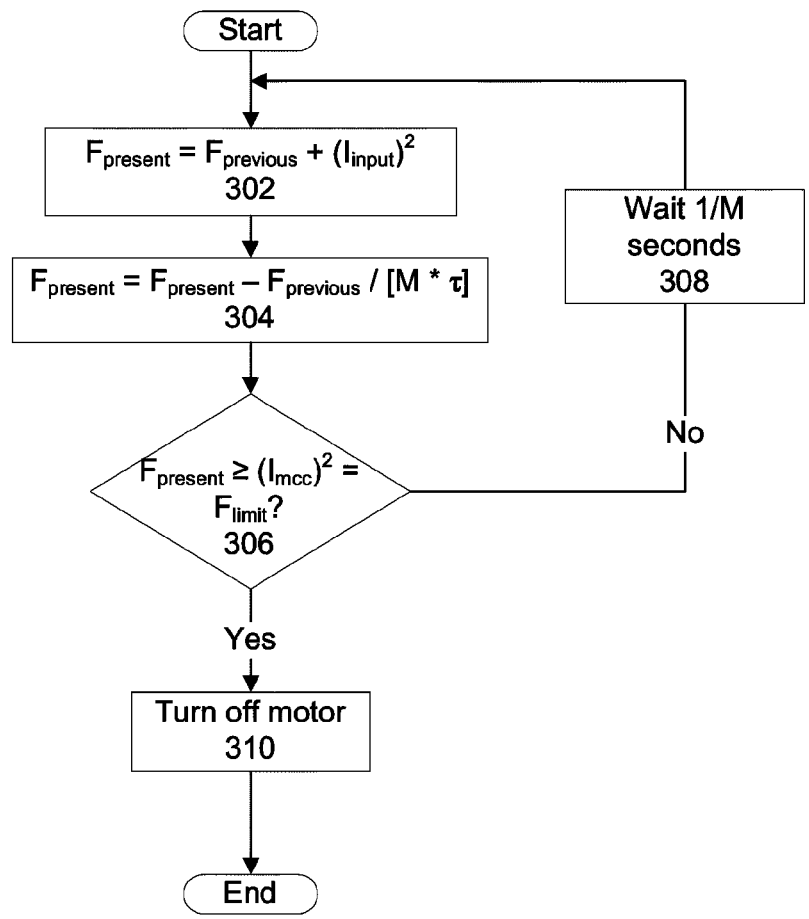
FIG. 3 illustrates an example of a method that is used to model a heating behavior of a motor and to implement a protection mechanism to prevent damaging the motor due to overload.

FIG. 3 illustrates an example of a method 300 that is used to model a heating behavior of motor 108 and to implement a protection mechanism (e.g., executed by controller 104) to prevent damage to motor 108 due to overload. One or more sequences of instructions used to perform method 300 may be stored in memory module 206 and/or storage module 210. While motor 108 is operating, processor module 204 may continually execute these sequences of instructions to monitor and model a heating behavior of motor 108 and shut off motor 108 should motor 108 reach a potentially damaging level of heat. In some aspects, this potentially damaging level of heat is modeled to be near or at the point of overload of motor 108. Method 300 comprises steps 302 and 304 to determine a present fuse level $F_{present}$ of motor 108. The present fuse level $F_{present}$ provides an indication of the heat of motor 108. Method 300 further comprises step 306 to compare the present fuse level $F_{present}$ of motor 108 to a limiting fuse level $F_{limit}$ of motor 108, which indicates that motor 108 is near or at the point of overload. If the present fuse level $F_{present}$ has reached or exceeded the limiting fuse level $F_{limit}$, then motor 108 is turned off, according to step 310, so that motor 108 may cool down. Otherwise, according to step 308, a certain amount of time may pass until the present fuse level $F_{present}$ of motor 108 may be determined again to compare against the limiting fuse level $F_{limit}$.

In some aspects, controller 104 may begin execution of method 300 (e.g., an initialization process at the "Start" of method 300 before step 302 is executed) at the same time or after motor 108 begins to operate. For example, an operator of CNC machine tool system 100 may specify a certain shaping operation to be performed by machine tool 102. This shaping operation may be communicated from the operator to controller 104 via user interface 106. Controller 104, in response, may initiate the shaping operation by controlling how much current is supplied to motor 108 of machine tool 102 for its operation. At the same time or after, controller 104 may begin executing method 300. In this initialization process, variables associated with method 300 may be set to certain values before the steps of method 300 are executed. For example, determining the present fuse level $F_{present}$ of motor 108 is based on a previous fuse level $F_{previous}$ that was determined in a previous iteration of method 300. If controller 104 is executing method 300 in the first instance (e.g., in a first iteration of method 300), then the previous fuse level $F_{previous}$ may be initialized to zero.

In some aspects, the previous fuse level $F_{previous}$ may be initialized to other values besides zero. For example, the previous fuse level $F_{previous}$ may be stored in storage module 210 and/or memory module 206 at the end of a previous operation of motor 108 (e.g., "stored $F_{previous}$"). Upon another operation of motor 108 (thus causing controller 104 to execute method 300 again), instead of initializing the previous fuse level $F_{previous}$ to zero, controller 104 may initialize the previous fuse level $F_{previous}$ to be the stored $F_{previous}$ value so that an amount of heat incurred by motor 108 at the beginning of the later operation is reflective of the previous amount of heat incurred by motor 108 at the end of the previous operation. In some aspects, a timer may be used to monitor an amount of time that has elapsed between the operations of motor 108, and an appropriate modification may be made to the stored $F_{previous}$ value to take into account how much motor 108 has cooled between the operations. Thus, in some aspects, the previous fuse level $F_{previous}$ may then be initialized to a modified stored $F_{previous}$ value.

Referring to step 302, the present fuse level $F_{present}$ is set to $F_{previous}+(I_{input})^2$, where $I_{input}$ indicates an input current supplied to motor 108 (e.g., as commanded by controller 104). The square of the current is used because the heating of motor 108 and its wiring is a function of the square of the current supplied to motor 108. Thus, step 302 provides a determination of the present fuse level $F_{present}$ of motor 108 taking into account the input current $I_{input}$ being supplied to motor 108. The present fuse level $F_{present}$ of motor 108 may also be referred to as an integrator value, a time delay fuse, or a time delay circuit breaker. In some aspects, the previous fuse level $F_{previous}$ as used in this step may be stored in memory module 206 and/or storage module 210 for later retrieval by processor 204 for determining the time to overload of motor 108.

Step 304 determines the present fuse level $F_{present}$ of motor 108 with a consideration of how much time has elapsed and how quickly motor 108 can lose its heat. Thus, the present fuse level $F_{present}$ is set to $F_{present}-F_{previous}/[M*\tau]$, where $\tau$ is a time constant indicating how quickly motor 108 can lose half of its heat and M is a periodic model rate indicating how frequently controller 104 may calculate and determine the present fuse level $F_{present}$ in order to monitor the heating behavior of motor 108 and implement a protection mechanism to prevent damage to motor 108. In some aspects, periodic model rate M is greater than or equal to about 250 Hz. In some aspects, present fuse level $F_{present}$, as determined by steps 302 and 304, is regarded as an approximate long-term average of the square of input current $((I_{input})^2)$ supplied to motor 108. In some aspects, the present fuse level $F_{present}$ may be stored in memory module 206 and/or storage module 210 for later retrieval by processor 204 for determining the time to overload of motor 108.

According to step 306, the present fuse level $F_{present}$ of motor 108 is compared to the square of the maximum continuous current rating $((I_{mcc})^2)$. Maximum continuous current rating $I_{mcc}$ indicates the maximum continuous current that can be applied to motor 108 without overloading motor 108. In some aspects, the square of the maximum continuous current rating $((I_{mcc})^2)$ of motor 108 is referred to as the limiting fuse level $F_{limit}$ of motor 108, which indicates that motor 108 is near or at the point of overload. Thus, if present fuse level $F_{present}$ is greater than or equal to $(I_{mcc})^2$ (e.g., the limiting fuse level $F_{limit}$), then motor 108 is turned off, according to step 310. Otherwise, according to step 308, controller 104 waits 1/M seconds before executing steps 302, 304, and 306 again. In some aspects, the limiting fuse level $F_{limit}$ may be stored in memory module 206 and/or storage module 210 for later retrieval by processor 204 for determining the time to overload of motor 108. The maximum continuous current rating $I_{mcc}$ and the time constant τ are motor parameters that may vary depending on a type, size, design, and/or other factors of a motor.

In some aspects, controller 104 may continually execute method 300 for as long as motor 108 is operating, in order to continually monitor and model an amount of heat incurred by motor 108. In some aspects, controller 104 may not even execute method 300 even though motor 108 is operating. This may occur, for example, if controller 104 is dedicating resources to other more important operations or if motor 108 is operating in a cool environment where motor 108 may not overheat, and thus, the amount of heat incurred by motor 108 does not need to be monitored and modeled.

Figure 4:
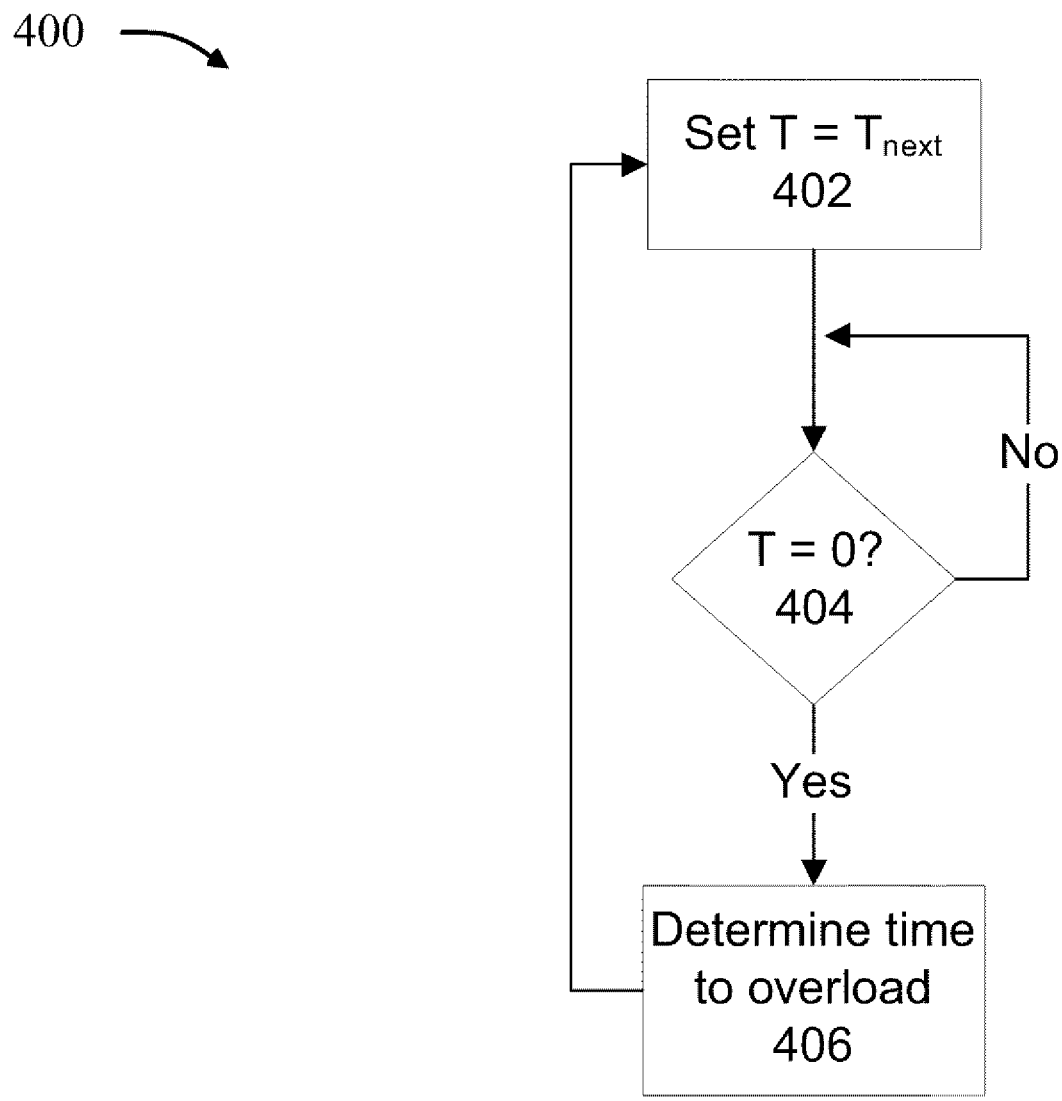
FIG. 4 illustrates an example of a method for determining when a time to overload of a motor is determined, in accordance with one aspect of the subject technology.

FIG. 4 illustrates an example of a method 400 for determining when a time to overload of motor 108 is determined, in accordance with one aspect of the subject technology. The steps provided by method 400 are executed according to certain time intervals so that a time to overload of motor 108 is continually determined and updated. A timer is used to keep track of an amount of time T remaining before controller 104 determines the time to overload of motor 108. Once the time to overload has been determined, another time $T_{next}$ is set for the timer, indicating a new amount of time remaining before the time to overload is determined again.

In some aspects, method 400 is an active process running on embedded control. That is, controller 104 (or an operating system running on controller 104) continually executes the steps provided by method 400, in parallel or serially with other miscellaneous processes or steps running on controller 104. Examples of such miscellaneous processes or steps include method 300 of FIG. 3 and machining operations of machine tool 102, such as cutting, shaping, and drilling operations. Thus, in one example, controller 104 may continually execute the steps provided by method 400 in parallel with the steps provided by method 300 of FIG. 3. In some aspects, controller 104 may begin executing the steps provided by method 400 after or at the same time as controller 104 begins executing the steps of method 300.

Referring to step 402, a time T for the timer is set to $T_{next}$, indicating an amount of time remaining before a time to overload of motor 108 is determined (e.g., step 406). At step 404, controller 104 monitors the time T to determine whether it has reached zero seconds. If so, then controller 104 proceeds in determining the time to overload according to step 406. Otherwise, controller 104 repeats the monitoring of the time T to determine whether it has reached zero seconds. In some aspects, there may be a time delay between each instance that controller 104 determines whether or not the time T has reached zero seconds, in order to preserve processing steps and resources. In some aspects, the time $T_{next}$ may be stored in memory module 206 and/or storage module 210 for later retrieval by processor 204 for determining the time to overload of motor 108.

The time T of step 402 may be set to any value of $T_{next}$ depending on processing limitations of CNC machine tool system 100. For example, in some aspects, the time T between repeating step 406 may be set such that the time to overload is not determined so often that user interface 106 cannot display the time to overload. That is, in some aspects, user interface 106 determines the threshold at which step 406 may be repeated. For example, if user interface 106 comprises an LCD monitor, the refresh rate of the LCD monitor may generally be about 50 Hz. Thus, if the time interval $T_{next}$ were set such that the frequency of repeating step 406 (e.g., $1/T_{next}$) is greater than about 50 Hz, then the LCD monitor may not necessarily display every instance of the time to overload determined under step 406, resulting in a waste of processing and resources of controller 104. In some aspects, the time interval $T_{next}$ may be set such that the frequency of repeating step 406 (e.g., $1/T_{next}$) may be less than about 50 Hz. In some aspects, this frequency may be referred to as a periodic rate. In some aspects, if controller 104 does not have enough processing resources to execute step 406, the time T of step 402 may be set to a longer time such that controller 104 may execute step 406 when sufficient processing resources become available.

There may be other ways that the timer can be implemented, in accordance with various aspects of the subject technology. For example, instead of having the timer decrease to zero, the time may increase. In such a case, once the time T of the timer has increased to a certain time (e.g., $T_1$), controller 104 may execute a given step (e.g., step 406). A new time (e.g., $T_2$) may be set such that when the time T of the timer increases from $T_1$ to $T_2$, step 406 may be executed again.

Figure 5:
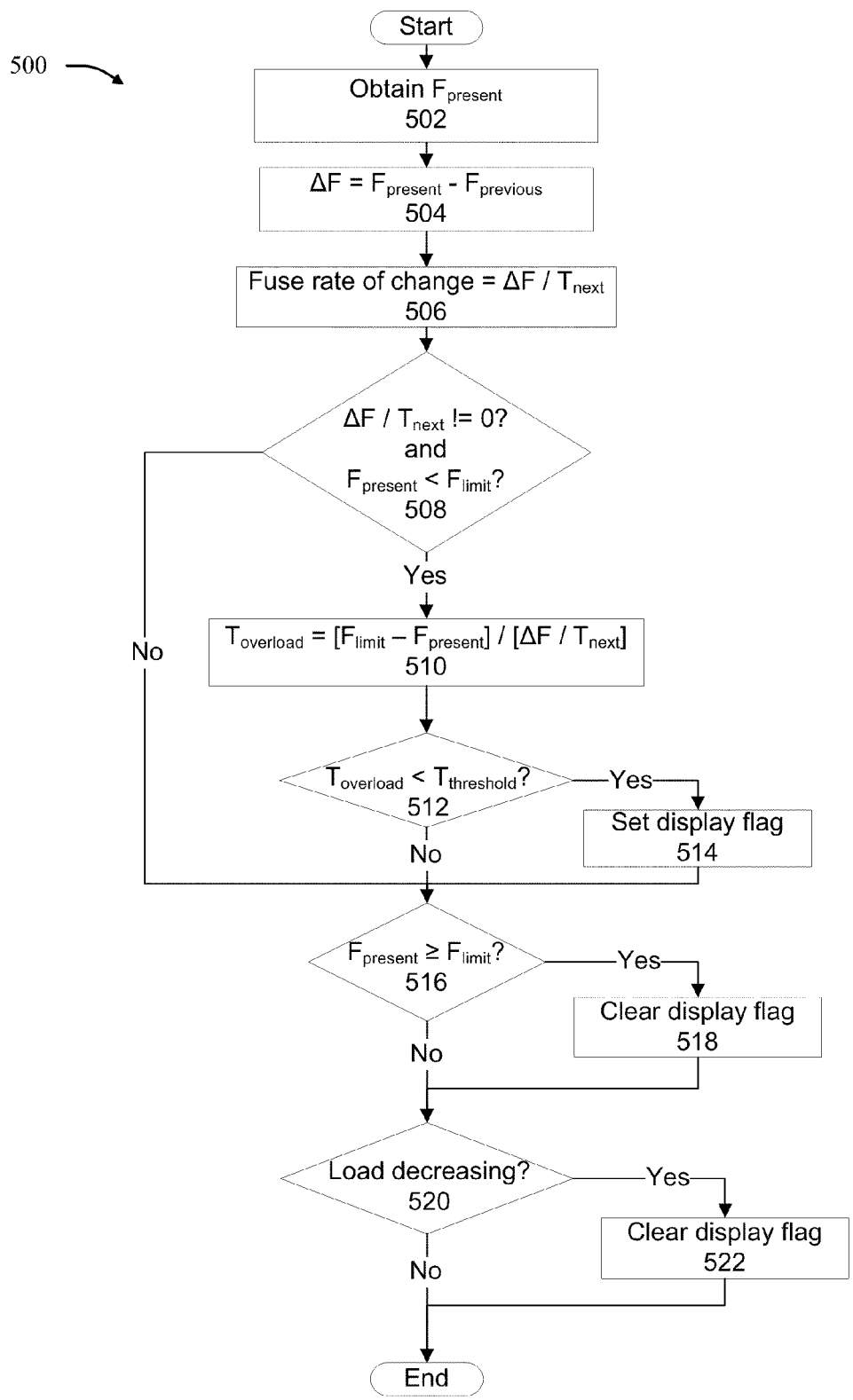
FIG. 5 illustrates an example of a method for determining a time to overload of a motor, in accordance with one aspect of the subject technology.

FIG. 5 illustrates, in detail, a method 500 for determining a time to overload $T_{overload}$, in accordance with one aspect of the subject technology. In some aspects, step 406 of FIG. 4 comprises method 500. Method 500 comprises: monitoring a present fuse level $F_{present}$ of motor 108; calculating a time to overload $T_{overload}$ of motor 108 based on the present fuse level $F_{present}$; and setting a display flag based on a display time $T_{threshold}$, the present fuse level $F_{present}$ of motor 108 and a load acting on motor 108. Controller 104 may then monitor the display flag and display the time to overload $T_{overload}$ on user interface 106 based on whether or not the display flag is set.

In some aspects, controller 104 may begin execution of the steps of method 500 when time T, as discussed with respect to FIG. 4, expires. Once methods 300 and 500 have been initialized, controller 104 may continually execute both methods in parallel.

According to steps 502, 504, and 506 of FIG. 5, a present fuse level $F_{present}$ of motor 108 is monitored. In step 502, the present fuse level $F_{present}$ is obtained by retrieving present fuse level $F_{present}$ stored in storage module 210 and/or memory module 206. The present fuse level $F_{present}$, for example, may be the present fuse level $F_{present}$ determined under step 304 of method 300 that is subsequently stored in storage module 210 and/or memory module 206. According to step 504, a fuse level difference ΔF between the present fuse level $F_{present}$ and a previous fuse level $F_{previous}$ of motor 108 is calculated. The previous fuse level $F_{previous}$, for example, may be retrieved from storage module 210 and/or memory module 206. This value, for example, may be the previous fuse level $F_{previous}$ determined under step 302 of method 300 that is subsequently stored in storage module 210 and/or memory module 206. Thus, the fuse level difference ΔF is calculated by subtracting the previous fuse level $F_{previous}$ from the present fuse level $F_{present}$.

According to step 506, a rate of change of the fuse level (e.g., fuse rate of change) is calculated based on the fuse level difference ΔF and the time interval $T_{next}$. That is, the fuse rate of change is given by the fuse level difference ΔF divided by the time interval $T_{next}$. The time interval $T_{next}$ indicates a difference in time between determining the present fuse level $F_{present}$ and determining the previous fuse level $F_{previous}$. In some aspects, the time interval $T_{next}$ is retrieved from storage module 210 and/or memory module 206. This time interval $T_{next}$, for example, may be the time interval $T_{next}$ that time T is set to under step 402 of method 400, and is subsequently stored in storage module 210 and/or memory module 206.

According to steps 508 and 510, the time to overload $T_{overload}$ is calculated based on the present fuse level $F_{present}$ of motor 108. According to step 508, the time to overload $T_{overload}$ is calculated if the fuse rate of change is not zero and if the present fuse level $F_{present}$ is lower than a limiting fuse level $F_{limit}$ of motor 108. The limiting fuse level $F_{limit}$ may be retrieved from storage module 210 and/or memory module 206, for example, as used in step 306 of method 300. Thus, according to step 508, the time to overload $T_{overload}$ is calculated if the present fuse level $F_{present}$ of motor 108 is changing (e.g., increasing towards the limiting fuse level $F_{limit}$), and if the present fuse level $F_{present}$ has not already reached the limiting fuse level $F_{limit}$ (which would cause motor 108 to turn off according to step 310 of method 300). Otherwise, the time to overload $T_{overload}$ is not determined.

According to step 510, the time to overload $T_{overload}$ is given by:

$$T_{overload} = [F_{limit} - F_{present}] / [\Delta F / T_{next}]$$

That is, the time to overload $T_{overload}$ is given by determining the fuse level difference between the limiting fuse level $F_{limit}$ and the present fuse level $F_{present}$ (i.e., the extent that present fuse level $F_{present}$ can increase before reaching the limiting fuse level $F_{limit}$). This value is then divided by the fuse rate of change to determine how much time remains before the present fuse level $F_{present}$ may reach the limiting fuse level $F_{limit}$ (i.e., the time to overload $T_{overload}$). As evident from this equation, the time to overload reaching zero seconds indicates that $F_{present}$ has reached the same value as $F_{limit}$. In such a case, according to steps 306 and 310 of FIG. 3, motor 108 is turned off.

According to steps 512, 514, 516, 518, 520 and 522, a display flag is set based on a display time $T_{threshold}$, the present fuse level $F_{present}$ of motor 108 and a load acting on motor 108. According to steps 512 and 514, if the time to overload $T_{overload}$ is less than the display time threshold $T_{threshold}$, then a display flag is set such that the time to overload $T_{overload}$ may be displayed on user interface 106. Thus, the display time threshold $T_{threshold}$ acts to put an upper limit on how much time is displayed as the time to overload $T_{overload}$. In some aspects, the display time threshold $T_{threshold}$ can be set by an operator of CNC machine tool system 100 at any amount of time depending on the operator's preference for how advance of a warning the operator may desire before motor 108 overloads. For example, the operator may set the display time threshold $T_{threshold}$ to be at 200 seconds. Thus, in this example, if the time to overload $T_{overload}$ is less than 200 seconds, then the display flag is set and the time may be displayed on user interface 106. On the other hand, if the time to overload $T_{overload}$ is equal to or greater than 200 seconds, then the display flag is not set and the time to overload $T_{overload}$ is not displayed on user interface 106.

According to steps 516 and 518, the display flag is cleared such that the time to overload $T_{overload}$ is not displayed if the present fuse level $F_{present}$ is greater than or equal to the limiting fuse level $F_{limit}$. If this condition is satisfied, then, according to step 310 of FIG. 3, motor 108 is turned off and the display of the time to overload $T_{overload}$ is unnecessary.

According to steps 520 and 522, the display flag is also cleared such that the time to overload $T_{overload}$ is not displayed if the load acting on motor 108 is decreasing. This is because if the load acting on motor 108 is decreasing, the load is either decreasing below or towards the maximum continuous load, in which case, motor 108 may be able to operate indefinitely without the threat of overloading. In other words, the time to overload $T_{overload}$ may be infinite when the load is decreasing. As such, the time to overload $T_{overload}$ does not need to be displayed.

Thus, according to various aspects of the subject technology, displaying the time to overload comprises displaying the time to overload $T_{overload}$ if the time to overload $T_{overload}$ is within an operator selected time frame (e.g., $T_{overload}$ is less than $T_{threshold}$), if the present fuse level $F_{present}$ is lower than a limiting fuse level $F_{limit}$ of motor 108, and if the load is not decreasing. If machine tool 102 comprises multiple motors, method 500 may be repeated for each additional motor in order to determine the time to overload $T_{overload}$ for each motor.

Figure 6:
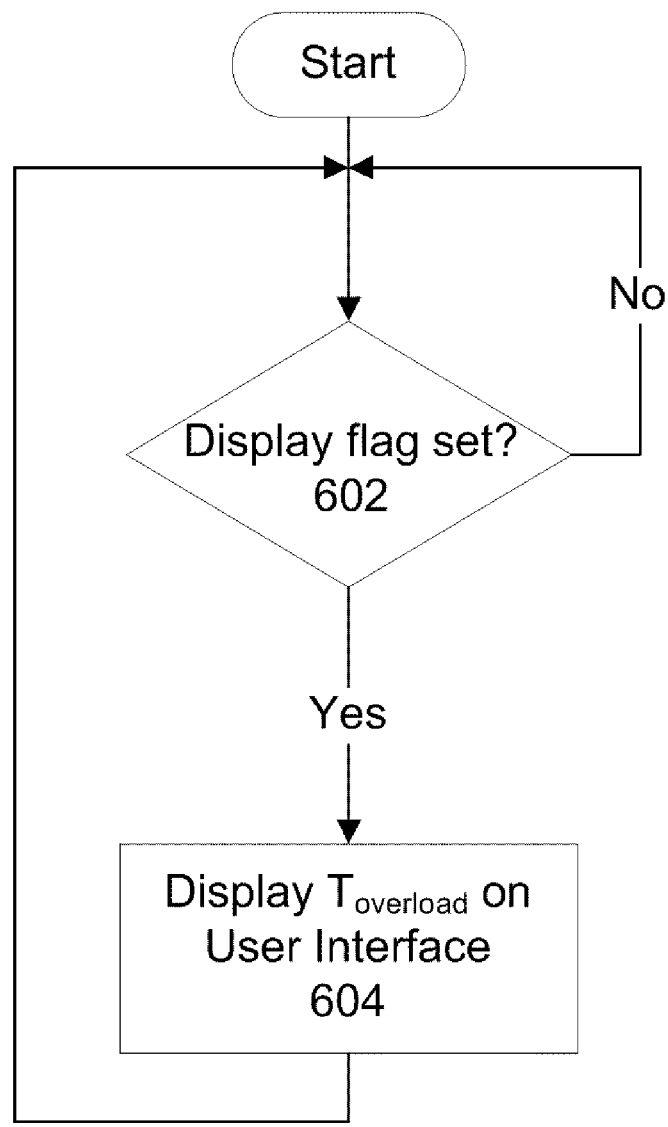
FIG. 6 illustrates an example of a method for displaying a time to overload of a motor, in accordance with one aspect of the subject technology.

FIG. 6 illustrates an example of a method 600 for displaying the time to overload $T_{overload}$, in accordance with one aspect of the subject technology. Controller 104 may execute method 600. In some aspects, method 600 is an active process running on embedded control. Controller 104 may execute the steps of method 600, in parallel or serially with other processes or steps running on controller 104. For example, controller 104 may execute the steps of method 600 in parallel with the steps of method 500, method 400 and/or method 300. According to step 602, controller 104 monitors the display flag (e.g., the display flag as discussed in steps 514, 518, and 522 of FIG. 5) to determine if it has been set. According to steps 602 and 604, if the display flag has been set, then the time to overload $T_{overload}$ is displayed on user interface 106. Otherwise, controller 104 continues to monitor the display flag according to step 602. In some aspects, there may be a time delay between each instance that controller 104 monitors the display flag to determine if it has been set, in order to preserve processing steps and resources.

Figure 7:
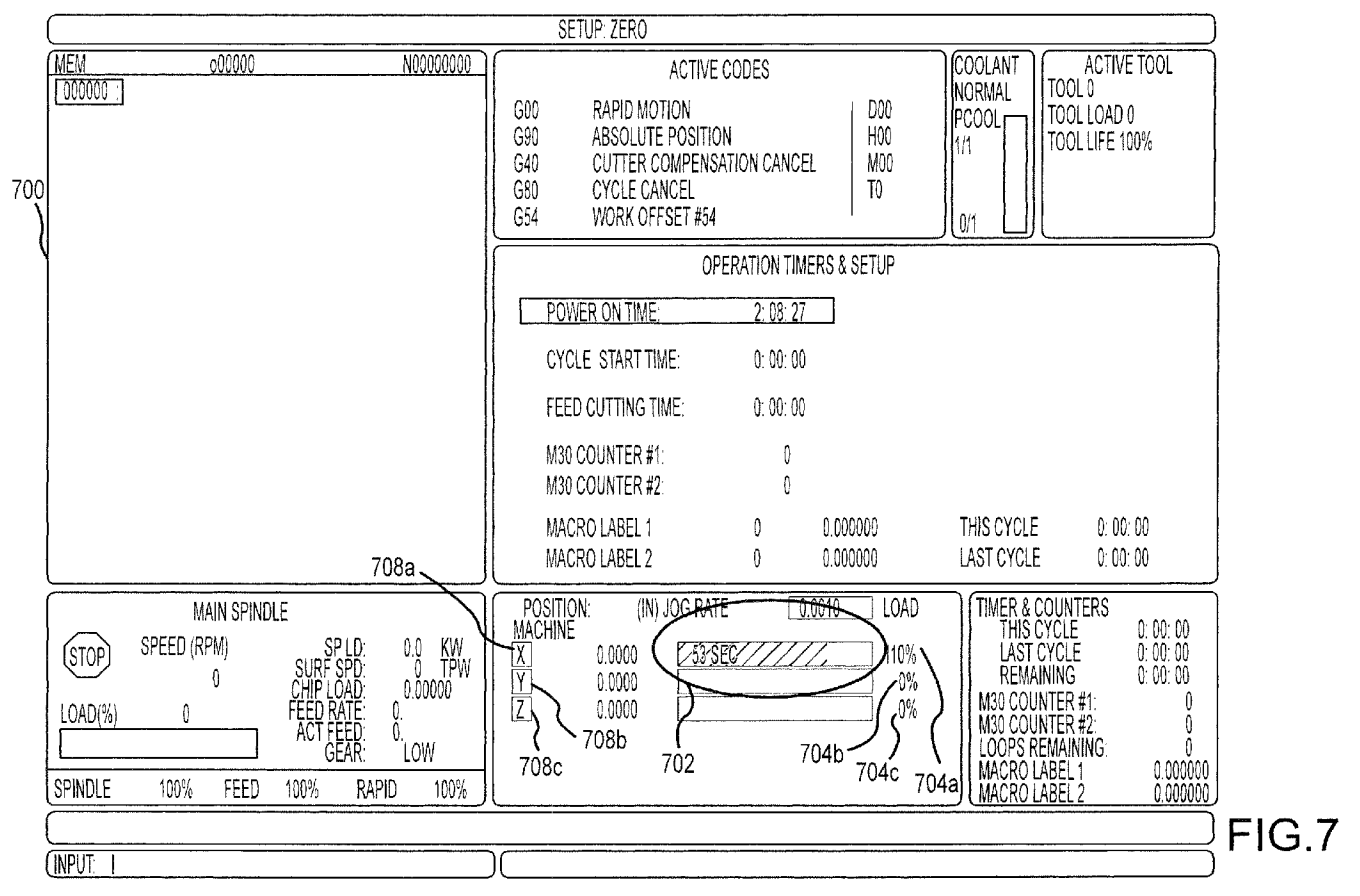

FIG. 7 illustrates an example of an onscreen display 700 for displaying time to overload information to an operator via user interface 106, in accordance with one aspect of the subject technology. Onscreen display 700 shows various parameters of machine tool 102. The various parameters of machine tool 102 shown in onscreen display 700 include loads 704 (e.g., 704a, 704b, and 704c) acting on motors 708 (e.g., 708a, 708b, and 708c) of machine tool 102. In this example, machine tool 102 comprises motor 708a (as indicated by machine X), motor 708b (as indicated by machine Y), and motor 708c (as indicated by machine Z). Display area 702 displays a time to overload of machine tool 102, for example as calculated under step 510 of FIG. 5. In this example, display area 702 shows the time to overload of motor 708a, with the time to overload being 53 seconds. In some aspects, a time to overload of a motor is displayed when its respective load increases above 100%. As shown in this example, the load 704a acting on motor 708a is 110% of its maximum continuous load. Once load 704a increases above 100%, a timer is started. The timer displays the time to overload while the load is above 100% of the maximum continuous load. If the time expires (e.g., reaches zero seconds), an overload alarm is generated by controller 104, thus shutting off the motor (e.g., step 310 of FIG. 3). If the load decreases (e.g., step 520 of FIG. 5) and/or if the time to overload is a sufficiently large value (e.g., greater than or equal to $T_{threshold}$ of step 512 of FIG. 5), then the time to overload may be removed from display area 702.

User interface 106 may be implemented in various ways, not limited to the example shown in FIG. 7. For example, user interface 106 may comprise displays of other parameters of motors 708, such as fuse levels, temperatures, and/or input currents. User interface 106 may use various color schemes to indicate how close motors 708 are to overloading. For example, one or more parts of the onscreen display 700 may change from a cool color, such as blue, to a hot color, such as red, to indicate an amount of heat incurred by motors 708, and correspondingly how close the motors 708 are to overloading. In some aspects, user interface 106 may display a time to overload of a motor regardless of whether the load is above or below 100% of a maximum continuous load of the motor. For example, the time to overload of the motor may be displayed when the load is at 90% of the maximum continuous load, and is not decreasing.

The techniques for determining the time to overload described herein may be implemented by various means. For example, these techniques may be implemented in hardware, software, or a combination thereof. For a hardware implementation, processing units used to determine the time to overload may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques for determining the time to overload may be implemented with modules (e.g., procedures, functions, and so on) that perform the functions described herein. The software codes may be stored in a memory unit (e.g., memory module 206 and/or storage module 210) and executed by a processor (e.g., processor 204). The memory unit may be implemented within the processor or external to the processor, in which case it can be communicatively coupled to the processor via various means as is known in the art.

The foregoing description is provided to enable a person skilled in the art to practice the various configurations described herein. While the present invention has been particularly described with reference to the various figures and configurations, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these configurations will be readily apparent to those skilled in the art, and generic principles defined herein may be applied to other configurations. Thus, many changes and modifications may be made to the invention, by one having ordinary skill in the art, without departing from the spirit and scope of the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The word "exemplary" is used herein to mean "serving as an example, instance, or illustration." Any embodiment described herein as "exemplary" is not necessarily to be construed as preferred or advantageous over other embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for determining a time to overload of a motor in a computer numerical controlled (CNC) machine tool, comprising:
monitoring a fuse level of a motor in a CNC machine tool;
calculating a time to overload of the motor based on the fuse level; and
displaying the time to overload on a user interface based on the fuse level of the motor and a load acting on the motor.

2. The method of claim 1, wherein monitoring the fuse level of the motor comprises:
determining a present fuse level of the motor;
calculating a fuse level difference between the present fuse level and a previous fuse level of the motor;
calculating a time period between determining the present fuse level and determining the previous fuse level; and
calculating a rate of change of the fuse level based on the fuse level difference and the time period.

3. The method of claim 2, wherein the time to overload of the motor based on the fuse level is calculated if the rate of change is not zero and if the present fuse level is lower than a limiting fuse level of the motor.

4. The method of claim 1,
wherein displaying the time to overload on the user interface based on the fuse level and the load acting on the motor comprises:
determining if the load acting on the motor is decreasing; and
displaying the time to overload if the time to overload is within an operator selected time frame, if the fuse level is lower than a limiting fuse level of the motor, and if the load is not decreasing.

5. The method of claim 1, wherein the fuse level of the motor is based on a maximum continuous current rating of the motor, a time constant of the motor, and an input current to the motor.

6. The method of claim 1, further comprising repeating the monitoring step, the calculating step, and the displaying step at a set time interval.

7. A computer numerical controlled (CNC) machine tool comprising:
a motor;
a controller configured to monitor a fuse level of the motor in a CNC machine tool and calculate a time to overload of the motor based on the fuse level; and
a user interface configured to display the time to overload based on the fuse level of the motor and a load acting on the motor.

8. The CNC machine tool of claim 7, wherein the controller is further configured to determine a present fuse level of the motor, calculate a fuse level difference between the present fuse level and a previous fuse level of the motor, calculate a time period between determining the present fuse level and determining the previous fuse level, and calculate a rate of change of the fuse level based on the fuse level difference and the time period.

9. The CNC machine tool of claim 8, wherein the controller is further configured to calculate the time to overload of the motor if the rate of change is not zero and if the present fuse level is lower than a limiting fuse level of the motor.

10. The CNC machine tool of claim 7, wherein the controller is further configured to determine if the load acting on the motor is decreasing, and wherein the user interface is further configured to display the time to overload if the time to overload is within an operator selected time frame, if the fuse level is lower than a limiting fuse level of the motor, and if the load is not decreasing.

11. The CNC machine tool of claim 7, wherein the fuse level of the motor is based on a maximum continuous current rating of the motor, a time constant of the motor, and an input current to the motor.

12. The CNC machine tool of claim 7, wherein the controller is further configured to repeat monitoring the fuse level of the motor and calculating the time to overload of the motor at a set time interval, and wherein the user interface is further configured to repeat displaying the time to overload at the set time interval.

13. A controller for a computer numerical controlled (CNC) machine tool, comprising:
a user interface;
a memory module containing executable instructions; and
a processor configured to execute the instructions to perform a method for:
monitoring a fuse level of a motor in a CNC machine tool;
calculating a time to overload of the motor based on the fuse level; and
displaying the time to overload on the user interface based on the fuse level of the motor and a load acting on the motor.

14. The controller of claim 13, wherein monitoring the fuse level of the motor comprises:
determining a present fuse level of the motor;
calculating a fuse level difference between the present fuse level and a previous fuse level of the motor;
calculating a time period between determining the present fuse level and determining the previous fuse level; and
calculating a rate of change of the fuse level based on the fuse level difference and the time period.

15. The controller of claim 14, wherein the time to overload of the motor based on the fuse level is calculated if the rate of change is not zero and if the present fuse level is lower than a limiting fuse level of the motor.

16. The controller of claim 13,
wherein displaying the time to overload on the user interface based on the fuse level and the load acting on the motor comprises:
determining if the load acting on the motor is decreasing; and
displaying the time to overload if the time to overload is within an operator selected time frame, if the fuse level is lower than a limiting fuse level of the motor, and if the load is not decreasing.

17. The controller of claim 13, wherein the fuse level of the motor is based on a maximum continuous current rating of the motor, a time constant of the motor, and an input current to the motor.

18. The controller of claim 13, wherein the method further comprises repeating the monitoring step, the calculating step, and the displaying step at a set time interval.

19. A machine-readable medium encoded with executable instructions for determining a time to overload of a motor in a computer numerical controlled (CNC) machine tool, the instructions comprising code for:
monitoring a fuse level of a motor in a CNC machine tool;
calculating a time to overload of the motor based on the fuse level; and
displaying the time to overload on a user interface based on the fuse level of the motor and a load acting on the motor.

20. The machine-readable medium of claim 19, wherein monitoring the fuse level of the motor comprises:
determining a present fuse level of the motor;
calculating a fuse level difference between the present fuse level and a previous fuse level of the motor;
calculating a time period between determining the present fuse level and determining the previous fuse level; and
calculating a rate of change of the fuse level based on the fuse level difference and the time period.

21. The machine-readable medium of claim 20, wherein the time to overload of the motor based on the fuse level is calculated if the rate of change is not zero and if the present fuse level is lower than a limiting fuse level of the motor.

22. The machine-readable medium of claim 19,
wherein displaying the time to overload on the user interface based on the fuse level and the load acting on the motor comprises:
determining if the load acting on the motor is decreasing; and
displaying the time to overload if the time to overload is within an operator selected time frame, if the fuse level is lower than a limiting fuse level of the motor, and if the load is not decreasing.

23. The machine-readable medium of claim 19, wherein the fuse level of the motor is based on a maximum continuous current rating of the motor, a time constant of the motor, and an input current to the motor.

24. The machine-readable medium of claim 19, wherein the instructions further comprise code for repeating the monitoring code, the calculating code, and the displaying code at a set time interval.

* * * * *